United States Patent
Tousignant et al.

(10) Patent No.: US 7,345,239 B2
(45) Date of Patent: Mar. 18, 2008

(54) SYSTEM AND METHOD FOR ROUTING CABLES

(75) Inventors: Philip Tousignant, Dracut, MA (US); Denis Foley, Shrewsbury, MA (US); Robert M. Mondor, Sutton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 463 days.

(21) Appl. No.: 10/732,975

(22) Filed: Dec. 11, 2003

(65) Prior Publication Data

US 2005/0126808 A1 Jun. 16, 2005

(51) Int. Cl.
*H02G 3/04* (2006.01)

(52) U.S. Cl. .................. 174/68.1; 174/68.3; 174/481; 385/135; 52/220.1; 52/220.7

(58) Field of Classification Search .............. 174/4, 174/49, 95, 99 R, 72 A, 72 R, 96, 72 C, 174/97, 101, 48, 65 R, 135, 68.3, 68.1, 35 GC, 174/35 R, 480, 481, 650; D13/155; 248/200.1; 385/134, 135; 52/220.1, 220.3, 220.5, 239; 361/800, 816, 818; 220/3.2, 3.3, 3.8, 4.02

See application file for complete search history.

(56) References Cited

U.S. PATENT DOCUMENTS

| | | | |
|---|---|---|---|
| 4,163,572 A * | 8/1979 | Benscoter ................. 174/72 C |
| 5,093,887 A * | 3/1992 | Witte .......................... 385/135 |
| 5,146,532 A * | 9/1992 | Hodge ........................ 385/135 |
| 5,161,580 A * | 11/1992 | Klug .......................... 174/68.3 |
| 5,286,919 A | 2/1994 | Benson et al. |
| 5,469,893 A * | 11/1995 | Caveney et al. ............ 174/101 |
| 5,734,777 A * | 3/1998 | Merriken et al. ........... 385/135 |
| 5,917,982 A * | 6/1999 | Vargas et al. ............... 385/134 |
| 5,957,556 A | 9/1999 | Singer et al. |
| 6,156,977 A * | 12/2000 | Benito-Navazo .......... 174/99 R |
| 6,215,064 B1 * | 4/2001 | Noble et al. ................ 385/135 |
| 6,344,611 B2 * | 2/2002 | Ewer et al. .................... 174/48 |
| 6,389,211 B1 * | 5/2002 | Mandry et al. ............. 385/135 |
| 6,444,903 B2 * | 9/2002 | Saeki et al. .................... 174/48 |
| 6,448,497 B1 * | 9/2002 | McCracken et al. .......... 174/97 |
| 6,546,181 B1 * | 4/2003 | Adapathya et al. ......... 385/135 |
| 6,603,918 B2 | 8/2003 | Daoud et al. |
| 6,708,918 B2 * | 3/2004 | Ferris et al. ................ 385/135 |
| 6,751,392 B1 * | 6/2004 | Szilagyi et al. ............. 385/134 |
| 6,850,687 B2 * | 2/2005 | Lavoie ....................... 385/135 |
| 6,884,942 B2 * | 4/2005 | McGrath et al. ........... 174/68.3 |
| 2003/0026084 A1 | 2/2003 | Lauchner |
| 2003/0075646 A1 | 4/2003 | Womack et al. |

FOREIGN PATENT DOCUMENTS

GB 2222913 A * 3/1990

* cited by examiner

*Primary Examiner*—Angel R. Estrada

(57) ABSTRACT

One disclosed system comprises a first channel for routing at least one of a plurality of cables in a first direction; a second channel for routing said at least one cable in a second direction; and a plurality of teeth spaced apart from one another and disposed in one of said first channel and said second channel, said teeth positioned to create spaces in-between said plurality of cables before said at least one cable transitions from said first direction to said second direction.

35 Claims, 5 Drawing Sheets

SYSTEM AND METHOD FOR ROUTING CABLES

BACKGROUND

Electronic systems, such as computers, typically comprise many parts or components such as, hard drives, disk drives, compact disk read-only-memory (CD ROM) drives, digital versatile disc (DVD) drives, fans, and processors that are often grouped together inside of a shared enclosure. It is common for several cables to be routed between various components to provide communication paths and/or power to these various components. These data and utility cables can be bulky and may typically be difficult to accommodate within a single enclosure due to limited space.

Moreover, the existence of several cables within an electronic system often makes it difficult to route the cables in an effective manner. Multiple cables are usually bundled together in order to increase the organization of such cables. However, bundling may cause damage to the individual cables when the system causes a sharp transition among cables. A sharp transition typically occurs as cables are routed from one direction to another usually resulting in cables bundling on top of one another. Furthermore, after a cable has been added or replaced, the additional bulk of the newly added cables at the bending transition point adds difficulty to the replacement of access panels and other parts that were removed to access the cables.

Bundling also adds difficulty to the replacement or installation of cables because of the additional time used to sort out the various cables near, or within, the cable bundling. Some manufacturers install extra cables during the assembly process in order to avoid having to add or replace cables should a need arise in the future. However, this creates additional costs to consumers who purchase electronic systems that use only a minimum number of cables.

SUMMARY

One embodiment provides a cable routing system comprising a first channel for routing at least one of a plurality of cables in a first direction, a second channel for routing the cable in a second direction, and a plurality of teeth spaced apart from one another and disposed in one of the first channel and the second channel, the teeth positioned to create spaces in-between the plurality of cables before the at least one cable transitions from the first direction to the second direction

BRIEF DESCRIPTION OF THE DRAWINGS

FIG. 1A is a diagram illustrating the minimum bend radius r of one cable;

DETAILED DESCRIPTION

Figure 1:
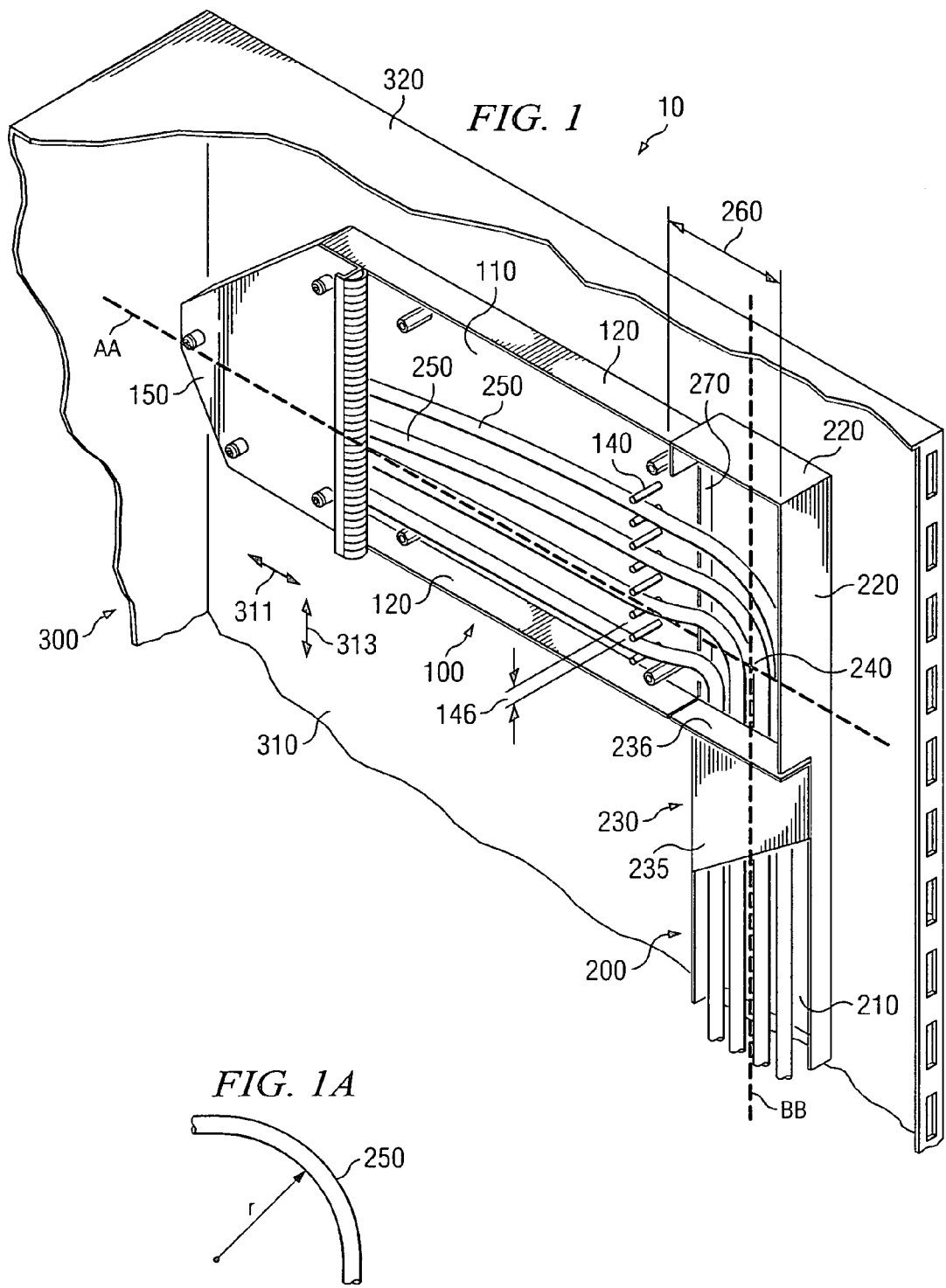
FIG. 1 is a diagram illustrating one embodiment of a cable routing mechanism.

FIG. 1 is a diagram illustrating one embodiment of cable routing mechanism 10. In one embodiment, cable routing mechanism 10 is used to increase the bend radius of cables 250 routed in electronics enclosure 300. Cable routing mechanism 10 includes a first channel 100 and a second channel 200. Channels 100 and 200 are connected to one another and positioned to create a right angle between the two channels. However, in alternative embodiments, channel 100 and channel 200 may be positioned to create any angle between the two channels.

Cable routing mechanism 10 is made of hot dipped galvanized steel according to some embodiments of the invention. Alternative embodiments utilize materials such as plastics, composites, resins, aluminum alloys, ceramics, and/or the like in providing one or more of the components of cable routing mechanism 10. For example, a configuration according to one embodiment may utilize hot dipped galvanized steel for channels 100 and 200 while utilizing plastic resins for teeth 140. In addition, cable routing mechanism 10 of embodiments may be made of any material that complies with the electromagnetic interference (EMI) requirements and specifications of the enclosure or area where cable routing mechanism 10 is used. However, cable routing mechanism 10 of alternative embodiments may be comprised of materials providing no, or limited, EMI shielding.

Channel 100 includes a channel base 110, sides 120, and a plurality of teeth 140. Channel base 110 is a flat planar member that makes up the core of channel 100. However, base 110 may take a form other than a flat planar shape, and therefore be any one of a number of various shapes. For example, base 110 may be curved, trapezoidal, or rounded. Sides 120 project outward from base 110 and provide a lip for channel 100. Teeth 140 project outward from base 110. Channel 100 of the illustrated embodiment includes a cover, such as cover 150, that fits over channel base 110 and sides 120 that is operative to protect and cover various cables routed through channel 100.

Channel 200, illustrated in FIG. 1, includes channel base 210 and channel sides 220. Base 210 is a flat planar member that makes up the core of channel 200. However, base 210 may take a form other than a flat planar shape and therefore be any one of a number of various shapes. For example, base 210 may be curved or rounded. Channel sides 220 project outward from channel base 210 and provide lips for channel 200.

Channel 200 of the illustrated embodiment includes a cover, such as cover 230. Cover 230 includes a cover base 235 and a flange section 236. Cover base 235 is a planar section, and flange section 236 extends outward from cover base 235 at an end of cover base 235, as shown in FIG. 1. Flange section 236 of the illustrative embodiment lines up with one of sides 120 of channel 100 and helps to keep cables 250 in channel 200. However, channel 200 may be arranged such that cover 230 does not include flange section 236. Although cover 230 is illustrated without fastening devices for simplicity, cover 230 may be configured such that it includes fastening devices, such as clips, adhesives, screws, clips, hook and loops, brads, rivets, etcetera, used to secure cover 230 to channel 200. Cover 230 helps to conceal and protect cables that are routed through channel 200. Although FIG. 1 shows channel 200 as including one cover 230, channel 200 may include multiple covers. Covers used for channel 200 may take any one of a number of various cover configurations. For example, channel cover 230 may be opaque, clear, vented, or any combination thereof.

Figure 2:
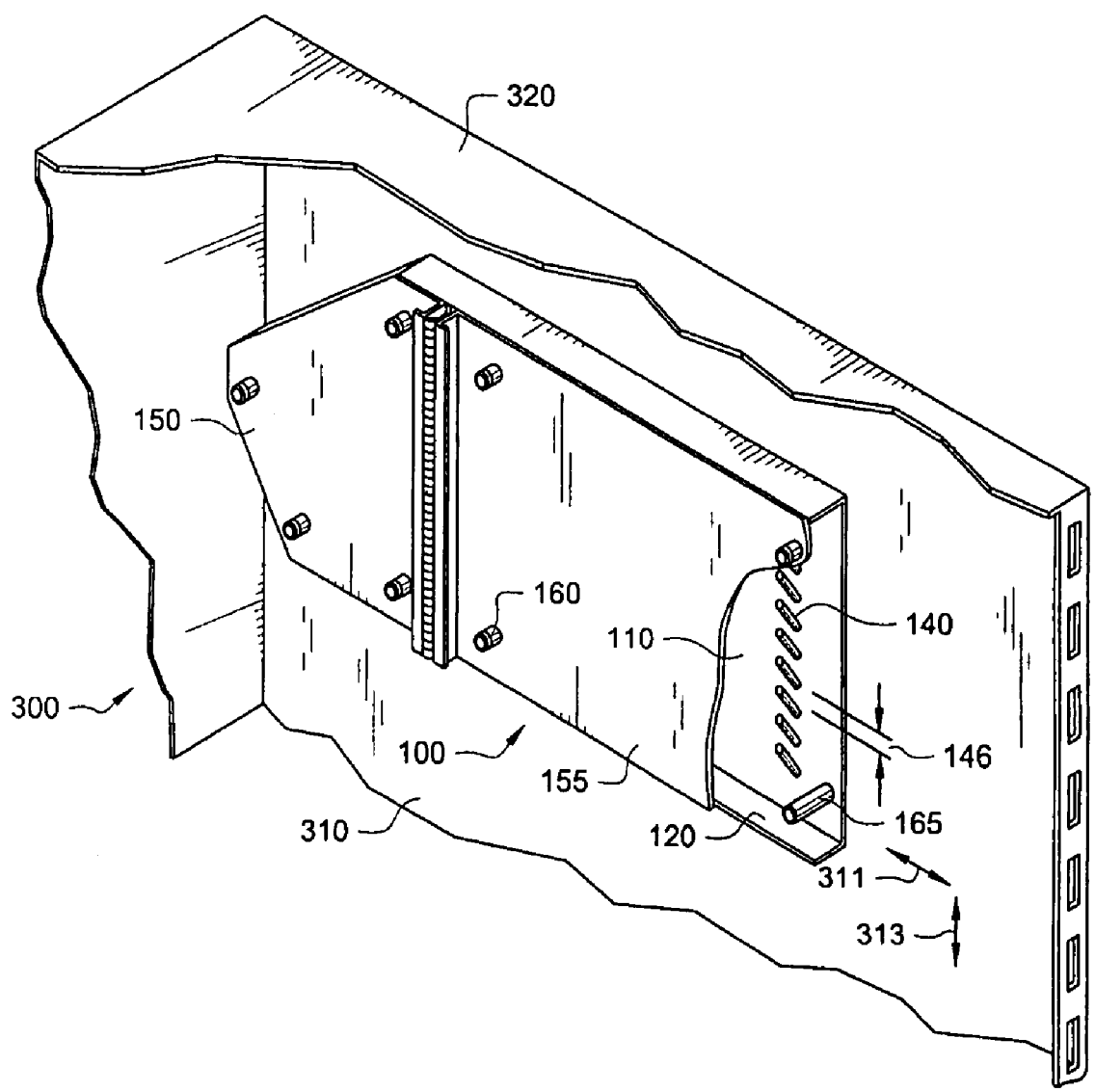
FIG. 2 is a diagram illustrating a view of FIG. 1 with one channel removed.

Similar to channel 200, channel 100 may include one or more covers to cover channel 100. As shown in FIG. 2, cable routing mechanism 10 may be configured such that channel 100 includes multiple covers 150 and 155. Covers 150 and 155 operate to conceal and protect various types of cables that may be routed in channel 100. Channel 100 may be configured so that access to cables routed in channel 100 may be gained by removing both covers 150 and 155 or access may be gained by only removing one cover. Covers 150 and 155 may be configured in many ways. For example, covers 150 and 155 may be hinged together or may not be connected at all. Covers 150 and 155 may also be opaque, clear, vented, or any combination thereof. In addition, cover 150 may be configured in one manner and cover 155 may be configured in a different manner. For example, cover 150 may be opaque, while cover 155 is vented or clear.

When covers 150 and 155 are used, channel 100 may also include fastening devices 160 and 165. Fastening devices 160 are attached to covers 150 and 155 and fastening devices 165 are attached to base 110. Cover fastening devices 160 and base fastening devices 165 operate to attach and secure covers 150 and 155 to base 110 thereby facilitating covers 150 and 155 in securely covering channel base 110 and sides 120. However, in an alternative embodiment, channel 100 may be configured so that covers 150 and 155 operate to cover base 110 but do not cover sides 120. For example, covers 150 and 155 may include a clip that operates to clip covers 150 and 155 to sides 120 thereby covering base 110 and any cables inside but not covering sides 120. The fastening devices may include any type of fastening devices, such as clips, adhesives, screws, clips, hook and loops, brads, rivets, etcetera. For example, fastening device 160 may be a threaded screw, and fastening device 165 may be a mating counterpart to the threaded screw. Therefore, fastening device 160 may be screwed into fastening device 165 thereby securing covers 150 and 155 to base 110 to cover base 110 and sides 120. However, channel 100 of embodiments may be configured so that it does not include covers or fastening devices.

FIG. 2 also illustrates channel 100 comprised of one complete and continuous unit or section and is therefore comprised of one base 110. However, in alternative embodiments, channel 100 may be configured such that channel 100 is multi-sectional so that channel 100 may comprise two or more separate bases mounted next to each other. The different sections and thus the different bases may be provided in any one of a number of shapes. For example, a first section could take the form of a rectangle and a second section could be non-rectangular, such as a trapezoid.

Cable routing mechanism 10 of the illustrative embodiment further includes a plurality of teeth 140 aligned vertically in channel 100 as shown in FIGS. 1 and 2. However, cable routing mechanism 10 may be configured such that teeth 140 are aligned in different configurations. For example, teeth 140 may be aligned in a variety of configurations, such as diagonal, zigzag, curved, etcetera. Teeth 140 operate to increase the bend radius of cables as cables transition from one direction to another, as described further herein. Teeth 140 of the illustrative embodiment project straight out from base 110. However, channel 100 may be arranged such that teeth 140 may extend from base 110 at a different angle such as an upward or downward diagonal direction. In addition, teeth 140 are illustrated in FIGS. 1 and 2 as circular rods or pegs. Teeth 140 may take any shape, such as rectangular or triangular pegs. Teeth 140 are also illustrated comprising a uniform thickness, but in alternative embodiments, teeth 140 may be of varying thickness. For example, some teeth may be relatively thin and some teeth may be relatively thick.

Teeth 140 are also illustrated in FIGS. 1, and 2 as comprising a uniform length. However, teeth 140 may be of varying lengths, although the length of teeth 140 according to some embodiments will not prevent a channel cover, such as 155, from mounting flush to a channel base, such as 110.

Teeth 140 are also spaced apart from one another by an amount to accommodate cables and provide cable paths 146. Teeth 140 may be spaced evenly so that cable paths 146 are of the same width. However, in selected embodiments, teeth 140 may be spaced apart unevenly so that cable paths 146 are of varying widths. For example, in one embodiment, teeth 140 may be configured to allow a single cable to pass between each cable path 146, and in another embodiment, teeth 140 may be situated so that multiple cables can pass through each cable path 146.

In the embodiment illustrated in FIG. 1, teeth 140 are located near the end proximal to channel 200 in order to provide spacing between cables transitioning between the horizontal routing of channel 100 and the vertical routing of channel 200 as well as to provide control of the cable bend radius. However, in alternative embodiments, teeth 140 may be located at varying positions in channel 100 or channel 200 depending on how cables will be routed through cable routing mechanism 10. For example, one effective placement of teeth 140 would be near the turn within a radius of a desired bend of the turn in order to achieve a maximum radius for the cables along the bend.

Teeth 140 may be mounted to channel base 110 in a variety of ways. Teeth 140 may be permanently attached to channel base 110 or may be attached so that teeth 140 may be added or removed to channel base 110 depending on various channel configurations. For example, teeth 140 may be pressed through the underside of channel base 110, welded to channel base 110, screwed into channel base 110, etcetera.

Figure 3:
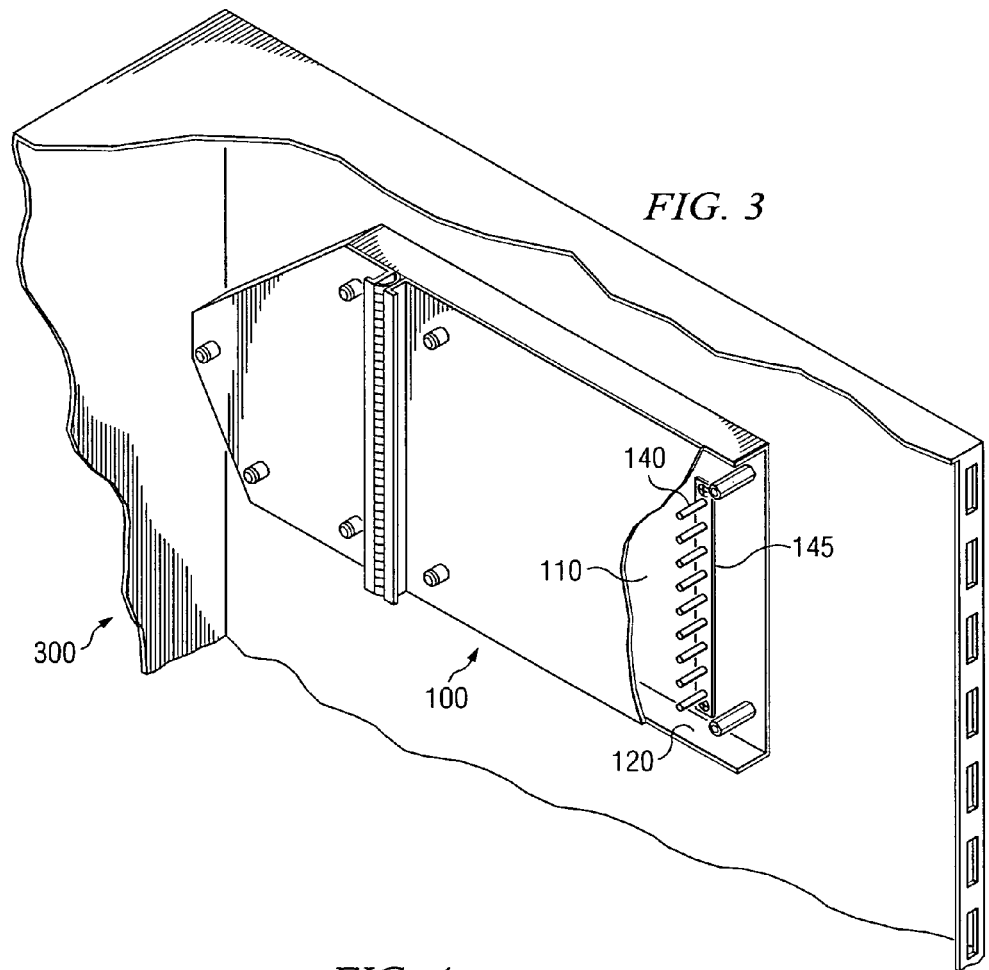
FIG. 3 is a diagram illustrating detail with respect to connecting cable routing teeth to a base.

FIG. 3 illustrates one technique for connecting teeth 140 to base 110. As shown in FIG. 3, channel 100 may be adapted such that teeth 140 are mounted to teeth base 145 that is mounted to channel base 110. Teeth base 145 is a planar member that runs vertically across channel 100 in the embodiment illustrated in FIG. 3. Although teeth base 145 is illustrated as extending along the entire channel base 110, cable routing channel 100 may be arranged such that teeth base 145 does not extend along the entire channel base 110. For example, teeth base 145 may be of varying sizes depending on the number of teeth mounted to teeth base 145 and the number of cables to be routed. Teeth base 145 may also be configured so that it can easily be removed from channel base 110 should a need arise. For example, teeth base 145 may be removed so that unused teeth could be removed or so that additional teeth could be added without having to remove the entire channel 100 from enclosure 300.

Channel 100 is shown in FIGS. 1 and 2 mounted to one wall 310 of enclosure 300. In this embodiment, wall 310 extends horizontally 311 and vertically 313 and enclosure top section 320 extends horizontally over channel 100. With respect to enclosure 300, channel 100 helps route cables in a horizontal direction and thus channel 100 may be referred to as a horizontal channel. Channel 200 is illustrated in FIG. 1 as also mounted to wall 310 and extends horizontally and vertically. Channel 200 helps route cables in a vertical direction, and therefore, channel 200 may be referred to as a vertical channel. In an alternative embodiment, cable routing mechanism 10 may be configured so that channels 100 and 200 are mounted to a frame or other structure located within enclosure 300. Cable routing mechanism 10 may also include a gasket mounted in-between wall 310 and channels 100 and 200. The gasket may be comprised of a materiel that complies with the electromagnetic interference (EMI) constraints and specifications of enclosure 300 so that the gasket is operative to minimize electromagnetic interference and not to interfere with any electronics inside of enclosure 300. The horizontal and vertical orientations used herein in the present embodiment are used to help explain one possible orientation. It should be understood that the embodiments described herein can be used in any orientation.

As illustrated in FIG. 1, vertical channel 200 and horizontal channel 100 are positioned inside of enclosure 300 so that the two channels are perpendicular to one another. However, vertical channel 200 and horizontal channel 100 may be positioned so that a different angle is formed with respect to one another. For example, channel 100 may run diagonal and channel 200 may also run diagonal.

The angle that exists between horizontal channel 100 and vertical channel 200 determines the bend angle that cables will travel across when transitioning from one channel to another channel. Thus, the bend angle is the angle that exists between various channels or directions that cables will transition between when cables pass from one channel or direction to another channel or direction. The orthogonal relationship of channel 100 with respect to channel 200 in the illustrative embodiment causes their central longitudinal axes AA and BB to intersect at a right angle 240. Thus, cables 250 will transition through a right angle bend when passing from horizontal channel 100 to vertical channel 200. Horizontal channel 100 and vertical channel 200 are positioned next to one another so that a cable bend area 260 is created. Cable bend area 260 is the area of interface/transition between channel 100 and channel 200. It is the area that the cables extend into after passing teeth 140 and, in this embodiment, channel connection seam 170. Connection seam 170 represents the location where, in one embodiment, edges of channel 100 and channel 200 are connected to one another. However, in alternative embodiments, channels 100 and 200 may be connected to one another at a different location. For example, a separate piece of material, such as a flat plate mounted to the back of both channels, may be used to connect the two channels together. In addition, various forms of connection may be used to secure channel 100 to channel 200. Channels 100 and 200 may be welded together, screwed together, riveted together, notched together, etcetera.

Bend area 260 provides sufficient space to allow for cable bending after cables 250 transition through cable paths 146, as described in more detail herein. Bend area 260 may be of varying sizes depending on the type, size, and number of cables to be routed through channel 100 into channel 200.

Cables 250 are shown in FIG. 1 as running through horizontal channel 100, into various cable paths 146, making a right angle bend in bend area 260, and then down into vertical channel 200. Teeth 140 operate to space cables 250 apart from one another before cables 250 transition through bend area 260 when moving from horizontal channel 100 into cable paths 146 and then into vertical channel 200. Spacing cables 250 apart from one another before cables 250 transition across right angle bend area 260 operates to increase the minimum bend radius of most cables 250 in bend area 260 over the bend radius they would have if bundled together. The minimum bend radius r of one cable 250 is illustrated in FIG. 1A. The minimum bend radius is the radius of curvature at the tightest portion of the curve defined by a cable 250. As illustrated in FIG. 1, channel 100 is wider than vertical channel 200 to provide extra space that helps to effectively space cables 250 apart from one another as cables 250 are routed into cable paths 246. However, channel 100 may be configured so that only a portion of channel 100 is wider than channel 200. As cables 250 are routed from one channel or position to another channel or position, cables 250 are spaced apart by passing through cable paths 146, in-between teeth 140, before entering into cable bend area 260.

The increased minimum bend radii of most cables helps prevent cables 250 from bundling along channel 100. Preventing the gathering and bundling of cables along channel 100 allows covers 150 and 155 to easily fit over channel base 110 and sides 120 and simplifies the task of removing or reinstalling channel covers 150 and 155 and any other components that were removed to access cables 250. As cables 250 travel down vertical channel 200, they retain some spacing which in turn will help prevent cables from bundling or gathering in one area in vertical channel 200. Cables 250 are thus spread out across the width of vertical channel 200. With cables 250 spread out in vertical channel 200, any vertical channel covers, such as cover 230, will easily fit over vertical channel base 210 and vertical channel sides 220 thereby simplifying the task of removing or reinstalling any vertical channel covers. Thus, cable routing mechanism 10 will help to increase the minimum bend radii of most cables routed from one direction to another direction and allows a spaced, coplanar arrangement of the cables which ultimately helps save time that is often wasted on trying to sort out bundled cables.

Figure 4:
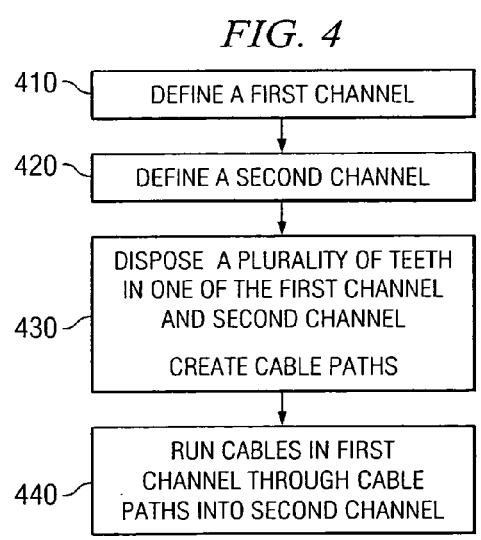
FIG. 4 is a flowchart illustrating an embodiment of a method for routing cables.
Figure 4A:
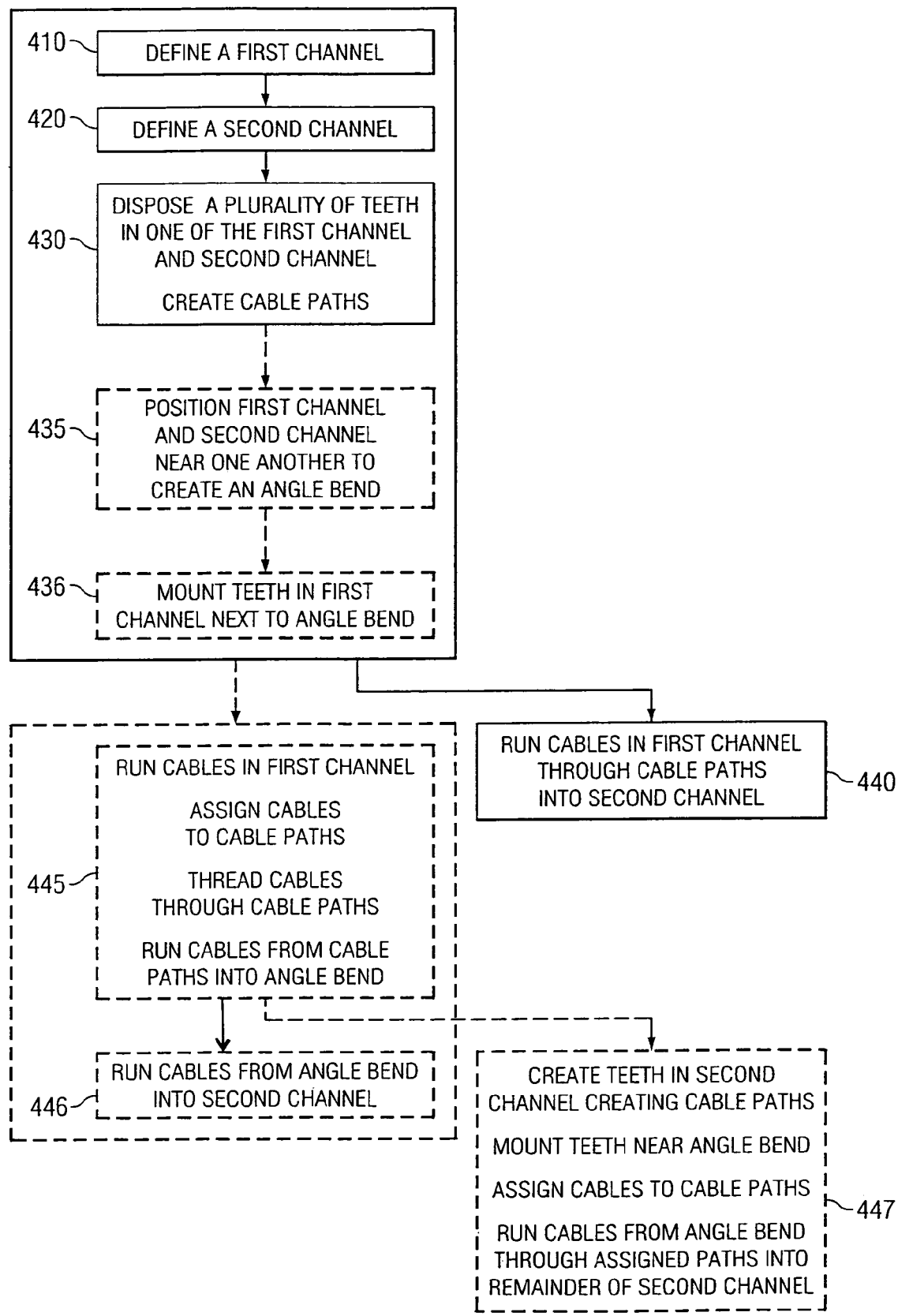
FIG. 4A is a flowchart of another embodiment of a method for routing cables.

FIG. 4 illustrates an embodiment of a method of cable routing. The method comprises defining a first channel; defining a second channel; disposing a plurality of teeth in one of the first channel and the second channel, wherein the teeth are spaced apart from one another to create a plurality of cable paths; and running the cables in the first channel, through the cable paths, and into the second channel. FIG. 4A is a flowchart illustrating another embodiment of a method of cable routing. In block 410, a first channel is defined. In block 420, a second channel is defined. In block 430, a plurality of teeth are disposed in one of the first channel and second channel whereby the teeth are spaced apart from one another creating cable paths. Normally, the cables will be run into the first channel, through the cable paths, and into the second channel as set forth in block 440. However, flow 400 may optionally include blocks 435 and 436 which follow block 430 and would return the flow to block 440. In block 435, the first channel and second channel are positioned near one another thereby creating an angle bend for the cables and a cable bend area thereby allowing the cables to maintain cable spacing as the cables transition from the first channel to the second channel. In block 436, the teeth are mounted in the first channel next to the angle bend.

However, the flow of FIG. 4A may also be arranged to substitute blocks 445 and 446 for block 440 which would occur with optional blocks 435 and 436. In block 445, the cables run into the first channel; the cables are then assigned to a cable path; then, the cables will be threaded through the assigned cable paths; and subsequently, the cables will be run from the assigned cable paths into the angle bend. In block 446, the cables will be run from the angle bend into the second channel. In an alternative embodiment, flow 400 may be situated so that block 446 is replaced with block 447 that would follow block 445. In block 447, a plurality of teeth may be disposed in the second channel. The teeth are then mounted in the second channel near the angle bend. After the teeth are mounted in the second channel, the cables in the angle bend are assigned to at least one of the second channel cable paths, and then the cables are run from the angle bend through the assigned paths into the remainder of the second channel.

Figure 5:
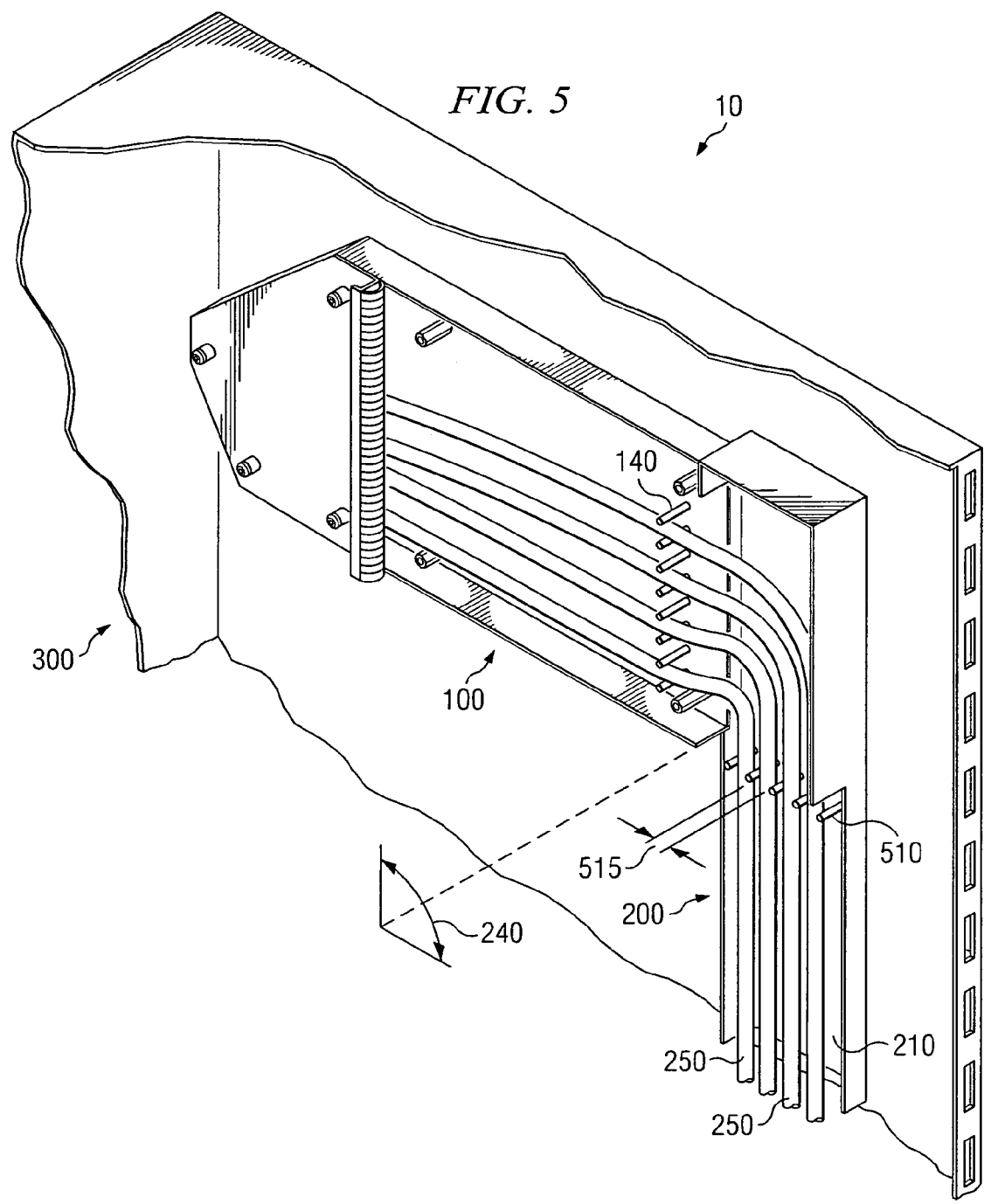
FIG. 5 is a diagram illustrating a view of FIG. 1 with teeth present in both channels.

FIG. 1 shows one set of teeth 140 mounted in horizontal channel 100 near right angle bend 240. However, an alternative configuration of cable routing mechanism 10 may include a plurality of teeth located throughout horizontal channel 100. In addition, FIG. 1 illustrates vertical channel 200 without teeth 140. Yet, as illustrated in FIG. 5, vertical channel 200 may include teeth 510 mounted inside of vertical channel 200, such as at the top of vertical channel 200 near right angle bend 240. Cable routing mechanism 10 is illustrated in FIG. 5 with channel 200's cover 230 removed in order to show teeth 510. Teeth 510 operate to help space cables 250 apart from one another as cables 250 are routed through channel 200. Similar to teeth 140, teeth 510 are spaced apart so as to create cable paths 515 in-between teeth 510. As illustrated in FIG. 5, teeth 510 extend across the width of channel 200 and are located near angle bend 240. Comparable to teeth 140, teeth 510 may be mounted to base 210 in a variety of ways. For example, teeth 510 may be pressed through the underside of channel base 210, welded to channel base 210, screwed into channel base 210, attached to some type of teeth base mounted to channel base 210, etcetera.

Teeth 510 may also be aligned in a variety of configurations, such as diagonal, zigzag, curved, etcetera. Teeth 510 may also extend from base 210 at a different angle such as an upward or downward diagonal direction. In addition, teeth 510 may take the form of any one of a number of various shapes. For example, teeth 510 may take the form of a rectangular or triangular peg. Although illustrated in FIG. 5 as comprising a uniform thickness, teeth 510 may be of varying thickness. For example, some of teeth 510 may be relatively thin and some of teeth 510 may be relatively thick. The length of teeth 510 may vary. However, the length of teeth 510 will not prevent a channel cover, such as 230, from mounting flush to channel base 210. Although FIG. 5 illustrates one set of teeth 510 mounted in channel 200, an alternative embodiment of cable routing mechanism 10 may include a plurality of teeth 510 mounted throughout vertical channel 200.

Although the foregoing examples have been made with reference to an enclosure, the concepts of the present invention may be applied to any of a number of cable routing situations. Cable routing mechanism 10 may be used to generally increase the minimum bend radius of most cables routed in any situation where cables are to be routed from one direction to another direction regardless of the location or angle existing between directions. This routing technique also tends to arrange the bend portions of the cables in a concentric relationship with progressively greater minimum bend radii such that the cables may be positioned in a generally coplanar arrangement that prevents bundling and other associated problems. Moreover, although particular orientations have been referenced with respect to the exemplary embodiments to aid the reader in understanding the concepts of the present invention, these orientation references are merely for reference and cable routing mechanisms of various embodiments of the present invention may be configured in any desired orientation.

What is claimed is:

1. A cable routing system comprising:
   a first channel for routing at least one of a plurality of cables in a first direction;
   a second channel for routing said at least one cable in a second direction; and
   a plurality of teeth spaced apart from one another and disposed in one of said first channel and said second channel, said teeth positioned to create spaces in-between said plurality of cables before said at least one cable transitions from said first direction to said second direction wherein at least one of said plurality of teeth is a peg.

2. The system of claim 1 wherein said first channel comprises:
   a base; and
   a plurality of sides projecting outward from said base.

3. The system of claim 2 wherein said second channel comprises:
   a base; and
   a plurality of sides projecting outward from said base.

4. The system of claim 3 wherein said first channel and said second channel are positioned next to each other to create a cable bend area wherein said bend area is sized to allow said cables to maintain said spaces as said cables transition from said first direction to said second direction.

5. The system of claim 3 wherein said second channel further comprises:
   a cover operating to cover said second channel base.

6. The system of claim 5 wherein said teeth are located within said second channel and project outward from said second channel base.

7. The system of claim 4 wherein said teeth are located in said first channel next to said bend area and said teeth project outward from said first channel base.

8. The system of claim 7 wherein said teeth are mounted to a teeth base wherein said teeth base is mounted to said first channel base.

9. The system of claim 7 wherein said first channel further comprises:
   a cover operative to cover said base.

10. The system of claim 7 wherein said first channel further comprises:
    a plurality of covers;
    a plurality of base fastening devices attached to said base;
    a plurality of cover fastening devices attached to said covers; and
    wherein at least one of said cover fastening devices is operative to secure at least one of said plurality of covers to said base by fastening to at least one of said plurality of base fastening devices.

11. The system of claim 10 wherein said plurality of covers comprise one or more of:
    a clear cover;
    an opaque cover;
    a vented cover; and
    any combination of said clear, opaque, or vented cover.

12. The system of claim 7 wherein said plurality of teeth extend diagonally outward from said first channel base.

13. The system of claim 12 wherein said first channel and said second channel are positioned at a right angle with respect to one another thereby creating a right angle bend.

14. The system of claim 13 wherein said first channel and said second channel are mounted inside of an electronics enclosure.

15. The system of claim 14 further comprising:
a gasket positioned between said channels and said electronics enclosure wherein said gasket is comprised of a material that is compatible with electromagnetic interference specifications of said electronics enclosure.

16. The system of claim 15 wherein at least a portion of said first channel is wider than said second channel thereby allowing said cables to spread out along said first channel before said cables transition from said first direction to said second direction.

17. The system of claim 1 wherein said first channel is multisectional.

18. The system of claim 1 wherein said first channel, said second channel, and said teeth are made of hot dipped galvanized steel.

19. A method for routing cables comprising:
defining a first channel;
defining a second channel;
disposing a plurality of teeth in one of said first channel and said second channel, wherein said teeth are spaced apart from one another to create a plurality of cable paths and at least one of said plurality of teeth is a peg; and
running said cables in said first channel, through said cable paths, and into said second channel.

20. The method of claim 19 wherein said first channel comprises:
a base; and
a plurality of sides.

21. The method of claim 20 further comprising:
positioning said first channel and said second channel near one another thereby creating an angle bend for said cables and a cable bend area wherein said bend area allows said cables to maintain cable spacing as said cables transition from said first channel to said second channel; and
mounting said plurality of teeth in said first channel next to said angle bend.

22. The method of claim 21 wherein said running said cables step comprises:
running said cables into said first channel;
assigning each cable of said plurality of cables to at least one cable path of said plurality of cable paths;
threading said cables through said assigned cable paths;
running said cables from said assigned cable paths into said angle bend; and
running said cables from said angle bend into said second channel.

23. The method of claim 22 further comprising:
disposing a plurality of teeth inside of said second channel, wherein said teeth are spaced apart from one another thereby creating a plurality of second channel cable paths;
mounting said plurality of teeth in said second channel near said angle bend; and
said running said cables from said angle bend into said second channel step comprises:
assigning each cable of said cables in said angle bend to at least one of said plurality of second channel cable paths, and
running said cables from said angle bend through said assigned second channel cable paths into the remainder of said second channel.

24. An apparatus for increasing the bend radius of a plurality of cables routed in a computer enclosure from a first direction to a second direction that is different from said first direction, said apparatus comprising:
a first channel having a base and a plurality of sides, and
a second channel having a base, a plurality of sides, and a plurality of teeth spaced apart from one another operating to create spaces in-between said plurality of cables wherein said first channel and said second channel are positioned to create a cable bend area wherein said bend area is sized to allow said cables to maintain said spaces as said cables transition from said first channel to said second channel and at least one of said plurality of teeth is a peg.

25. The apparatus of claim 24 wherein said first channel is mounted in an orientation that is vertical with respect to said second channel inside of said computer enclosure so that a right angle is formed between said first channel and said second channel.

26. The apparatus of claim 25 wherein said teeth are mounted next to said cable bend area.

27. The apparatus of claim 24 wherein said first channel further comprises:
at least one cover;
a plurality of base fastening devices attached to said base; and
a plurality of cover fastening devices attached to said cover wherein said plurality of cover fastening devices operate to secure said cover to said base by fastening to said plurality of base fastening devices.

28. The apparatus of claim 27 wherein said first channel further comprises:
a plurality of teeth mounted inside of said first channel spaced apart from one another projecting outward from said first channel base wherein said teeth are operative to space said cables apart as said cables run through said first channel.

29. The apparatus of claim 24 wherein said second channel further comprises:
at least one cover;
a plurality of second channel base fastening devices attached to said second channel base; and
a plurality of cover fastening devices attached to said cover wherein said cover fastening devices operate to secure said cover to said second channel base by fastening to said second channel base fastening devices.

30. The apparatus of claim 24 wherein at least one of said plurality of teeth is shaped differently from the remaining plurality of teeth.

31. The apparatus of claim 24 wherein at least one of said plurality of teeth is sized differently from the remaining plurality of teeth.

32. The apparatus of claim 25 further comprising a gasket positioned in-between said channels and said computer enclosure wherein said gasket is made of a material that operates to minimize electromagnetic interference.

33. A mechanism for routing a plurality of cables in an electronics enclosure, said mechanism comprising:
means for routing said cables in a first direction;
means for routing said cables in a second direction;
means for increasing a plurality of bend radii of said plurality of cables while transitioning from said first direction routing means to said second direction routing means, wherein said bend radii increasing means comprises a plurality of teeth defining said bend radii and at least one of said plurality of teeth is a peg.

34. The mechanism of claim 33 further comprising:
means for covering cables routed in said first direction routing means; and means for securing said covering means to said first direction routing means.

35. The mechanism of claim 34 further comprising:

means for covering cables routed in said second direction routing means; and means for securing said covering means to said second direction routing means.

* * * * *